(12) United States Patent
Usui

(10) Patent No.: US 6,460,907 B2
(45) Date of Patent: Oct. 8, 2002

(54) STRADDLE TYPE FOUR-WHEELED ALL-TERRAIN VEHICLE AND FRONT GUARD FOR THE SAME

(75) Inventor: Takeshi Usui, Takasago (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 09/810,533

(22) Filed: Mar. 19, 2001

(65) Prior Publication Data
US 2001/0024042 A1 Sep. 27, 2001

(30) Foreign Application Priority Data

Mar. 21, 2000 (JP) .......................................... 2000-078348
Apr. 21, 2000 (JP) .......................................... 2000-120524

(51) Int. Cl.⁷ ................................................. B60R 19/52
(52) U.S. Cl. ........................ 293/115; 293/102; 293/117; 296/205
(58) Field of Search ................................. 293/102, 105, 293/113, 115, 117; 296/78.1, 205; 180/68.4, 68.6

(56) References Cited

U.S. PATENT DOCUMENTS

| 4,215,496 A | * | 8/1980 | Wehr ........................... 37/117.5 |
| 4,535,869 A | * | 8/1985 | Tsutsumikoshi et al. .... 180/311 |
| 4,667,765 A | * | 5/1987 | Tomoyuki ................... 180/311 |
| 4,687,069 A | * | 8/1987 | Inomata et al. ............. 180/68.2 |
| 4,800,986 A | * | 1/1989 | Hayes, III ...................... 182/18 |
| 5,094,313 A | * | 3/1992 | Mauws ........................ 180/210 |
| 5,490,574 A | * | 2/1996 | Ishiizumi et al. ........... 180/68.1 |
| 5,522,582 A | * | 6/1996 | Dilks ........................... 254/323 |
| 5,620,217 A | * | 4/1997 | Ichikawa et al. ............ 293/102 |
| 5,663,541 A | * | 9/1997 | McGregory, II ........... 200/17 R |
| 5,695,228 A | * | 12/1997 | Storer .......................... 293/115 |
| 5,707,072 A | * | 1/1998 | Hopper ...................... 280/491.5 |
| 5,794,976 A | * | 8/1998 | Stevicks ....................... 280/770 |
| 5,954,364 A | * | 9/1999 | Nechushtan ................. 280/781 |
| 6,029,750 A | * | 2/2000 | Carrier .......................... 169/52 |
| 6,104,099 A | * | 8/2000 | Mizuta et al. ............... 307/9.1 |
| 6,186,283 B1 | * | 2/2001 | Luker ........................... 188/32 |

FOREIGN PATENT DOCUMENTS

| JP | A 3-14780 | 1/1991 |
| JP | A 5-58365 | 3/1993 |

* cited by examiner

Primary Examiner—Stephen T. Gordon
Assistant Examiner—Lori L. Coletta
(74) Attorney, Agent, or Firm—Oliff & Berridge, PLC

(57) ABSTRACT

A straddle type four-wheeled all-terrain vehicle includes: a body frame having a front end part; a front guard joined to the front end part of the body frame; and a winch unit including an electric winch and a guide roller mechanism for guiding a tow rope. The electric winch and the guide roller mechanism are arranged longitudinally from a rear toward a front in that order in a lower part of a space in the front guard.

9 Claims, 14 Drawing Sheets

STRADDLE TYPE FOUR-WHEELED ALL-TERRAIN VEHICLE AND FRONT GUARD FOR THE SAME

BACKGROUND OF THE INVENTION

1. Field of the Invention

The present invention relates to a straddle type four-wheeled all-terrain vehicle (sometimes abbreviated to "ATV") provided on its front part with a protective front guard and a winch for towing and, more specifically, to a winch supporting structure incorporated into a straddle type four-wheeled all-terrain vehicle.

The present invention also relates to a straddle type four-wheeled all-terrain vehicle having a body frame, a front carrier mounted on the body frame so as to permit loading baggage thereon from the front side thereof, a handlebar for steering front wheels, a seat or straddle type seat disposed behind the handlebar, a rear carrier disposed behind the saddle, a front fender disposed below the front carrier so as to cover the front wheels, and a front guard formed by assembling pipe members as principal components and, more specifically, to the front guard mounted on a front part of the body of the straddle type four-wheeled all-terrain vehicle.

2. Description of the Related Art

A straddle type four-wheeled all-terrain vehicle (hereinafter referred to simply as "vehicle") often travels rugged places. A winch included in the vehicle is used for towing a heavy matter or hauling the vehicle out of a marshy place by fastening one end of a tow rope to a fixed object, such as a tree, and winding the tow rope.

FIG. 13 shows a conventional straddle type four-wheeled all-terrain vehicle 270 (hereinafter referred to simply as "vehicle 270") provided with a winch 271. Usually, the winch 271 is supported on a special winch supporting structure 272 disposed in front of a front guard 273. The winch 271 is protected by a winch guard 274.

The conventional vehicle 270 provided with the winch 271 has the following problems to be solved.

(1) Part of the winch projecting forward from the body of the vehicle is a nuisance to operations for controlling the vehicle and it is possible for the winch to collide against an obstacle and to be damaged.

(2) The winch supporting structure must be strongly built, needs many parts and is heavy and expensive.

(3) The winch projecting forward from the vehicle spoils the appearance of the vehicle.

(4) A vehicle provided with a winch and a vehicle not provided with any winch have different constructions, respectively. Therefore, a winch supporting structure must be specially added to a vehicle originally not provided with any winch when incorporating a winch to the same vehicle, which is difficult and increases the cost of the vehicle greatly.

Moreover, generally, the front guard of the aforesaid vehicle is strongly built by assembling large-diameter pipe members so that the same may not be damaged when the same collides against rocks or branches of trees because the vehicle travels places of rough terrain.

As shown in FIGS. 14A and 14B, a conventional front guard 251 is a unitary structure formed by uniting together big pipes of the same large outside diameter and is joined to a front end part of a body frame 255. FIG. 14B shows the front guard 251 shown in FIG. 14A disconnected from the front end part of the body frame 255. The front guard 251 is provided in its upper part with a lateral frame 252. FIG. 15 shows a front guard 261 integrally combined with a grille 262. The grille 262 is surrounded by side frames 263 and a lateral frame 264. The side frames 263 and the lateral frame 264 are formed by welding together big pipe members.

Conventional front guards are disclosed in Japanese Laid-Open Publication Nos. Hei 5-58365 and Hei 3-14780. Both of the front guards are unitary structure formed by welding together big pipe members of the same outside diameter and are joined to a front end part of a body frame with bolts.

The conventional front guards, however, have the following problems.

(1) Although a part to be joined to the body frame of the vehicle must be strongly built of big pipe members, the front guard has a needlessly large weight if other parts, such as parts for protecting the front fender and headlights, of the front guard are formed of big pipe members of the same outside diameter as that of the pipe members forming the part to be joined to the body frame, which is an obstruct to the reduction of the body weight of the vehicle.

(2) Parts for protecting the front fender and the headlights of the front guard are frames respectively having complicated shapes, which are difficult to fabricate by assembling big pipe members and needs a high manufacturing cost.

(3) The front guard of a unitary structure formed by integrally uniting together big pipe members takes much time and needs difficult work for joining the same to and removing the same from the body frame of the vehicle, must be accurately formed and is costly.

SUMMARY OF THE INVENTION

The present invention has been made in view of the aforesaid problems and it is therefore an object of the present invention to provide a straddle type four-wheeled all-terrain vehicle provided with a winch supporting structure capable of supporting a winch thereon such that the winch or a member associated with the winch does not project forward from a body of the vehicle, of limiting increase in the number of parts, weight and cost to the least possible extent and of facilitating mounting the winch thereon.

Another object of the present invention is to provide a front guard for a straddle type four-wheeled all-terrain vehicle, formed in a relatively lightweight construction and capable of being easily fabricated at a low cost and of effectively reducing body weight.

According to a first aspect of the present invention, a straddle type four-wheeled all-terrain vehicle includes: a body frame having a front end part; a front guard joined to the front end part of the body frame; and a winch unit including an electric winch and a guide roller mechanism for guiding a tow rope, the electric winch and the guide roller mechanism being arranged longitudinally from a rear toward a front in that order in a lower part of a space in the front guard.

In the straddle type four-wheeled all-terrain vehicle according to the present invention, the guide roller mechanism and the electric winch are disposed in the space in the front guard and none of the parts of them project outside from the front guard. Therefore, the winch and the guide roller mechanism do not obstruct operations for controlling the straddle type four-wheeled all-terrain vehicle. The straddle type four-wheeled all-terrain vehicle does not need any additional guard members specially for protecting the winch and the guide roller mechanism. The winch and the guide roller mechanism do not spoil the appearance of the straddle type four-wheeled all-terrain vehicle. The front guard joined to the front end part of the body frame is able to protect the winch and the guide roller mechanism from rocks and branches of trees.

Preferably, the body frame has right and left lower frame members each having a front end. The front guard has right and left lower members joined to the front ends of the right and left lower frame members of the body frame and extending forward from the front ends of the right and left lower frame members, right and left front members extending upward from the right and left lower members, and a lower cross member extending between the right and left lower members. A winch support member for supporting the electric winch is joined to the lower cross member of the front guard.

Since the winch supporting member is joined to the lower cross member, i.e., the load-bearing member, of the front guard, increase in the number of parts and weight can be limited to the least extent and it can be produced easily. Since the winch supporting member is provided to the lower cross member of the front guard, a winch can be incorporated into a vehicle originally not provided with any winch without requiring any additional members.

In the straddle type four-wheeled all-terrain vehicle according to the present invention, it is desirable that a guide roller mechanism support member capable of detachably supporting the guide roller mechanism in front of the electric winch is formed integrally with the winch support member.

Thus, the guide roller mechanism for guiding the tow rope can be easily mounted on the front guard without using any additional members.

In the straddle type four-wheeled all-terrain vehicle according to the present invention, it is desirable that the electric winch is disposed in a space between a lower part of a radiator for cooling an engine cooling water disposed in a front part of the body frame and the lower cross member. A baffle plate is disposed over the winch so as to extend between the front members of the front guard and the lower part of the radiator.

Thus, the winch disposed in the front part of the vehicle does not obstruct the flow of cooling air from the front of the vehicle toward the radiator. Since the winch is disposed in the space between the lower part of the radiator and the lower cross member extended between the lower members, the winch is not disposed in front of the radiator. Since the baffle plate is disposed above the winch, cooling air is able to flow substantially straight toward the radiator and hence the cooling effect is not reduced by the winch.

According to a second aspect of the present invention, a front guard formed mostly of pipe members and joined to a front end of a body frame included in a straddle type four-wheeled all-terrain vehicle comprising the body frame, a front carrier mounted on a front part of the body frame and permitting loading a baggage thereon from a front, a handlebar for steering front wheels, a seat for a driver disposed behind the handlebar, a rear carrier disposed behind the saddle, and a front fender disposed below the front carrier so as to cover the front wheels; the front guard includes: an upper guard frame; and a lower guard frame detachably joined to the upper guard frame. The lower guard frame is joined to front ends of right and left upper and lower frame members included in the body frame. The pipe members forming the upper guard frame have a diameter smaller than a diameter of the pipe members forming the lower guard frame.

In the straddle type four-wheeled all-terrain vehicle according to the second aspect of the present invention, the front guard is divided into the upper and the lower guard frame, the lower guard frame is joined to the upper and lower frame members of the body frame to secure a strength required of the front guard, and the upper guard frame that does not need to be very strong is formed of the pipe members having a relatively small diameter. Thus, the front guard is relatively lightweight and can be easily fabricatedatrelativelylowmaterialandprocessingcosts. only the lower guard frame of the front guard is joined to the upper and the lower frame members of the body frame. The upper guard frame of the front guard can be separated from the lower guard frame. Therefore, the front guard can be easily joined to the body frame. Separation of the upper guard frame of the front guard from the lower guard frame of the same facilitates work for the maintenance of parts disposed behind the front guard.

Preferably, a lower end part of the upper guard frame is fastened to an upper end part of the lower guard frame with a bolt. An upper end part of the upper guard frame is fastened to a lower part of the front carrier with a bolt.

Thus, the upper guard frame of the front guard can be easily joined to the upper end part of the lower guard frame of the front guard and the front carrier. Therefore, the upper guard frame of the front guard is simple in construction, can be disposed in front of an upper front part of the body of the vehicle and is capable of effectively protecting the lamps and the fender and of supporting the front carrier.

Preferably, the lower guard frame of the front guard includes a pair of side members curved in the shape of the letter C, a cross member joined to the lower ends of the pair of side members, and stay members extending obliquely upward from upper end parts of the pair of side members, and the lower guard frame can be fastened to the front ends of the upper and the lower frame members with bolts.

Sufficient strength can be easily given to the front guard. A front part of the body frame can be sufficiently reinforced by thus combing the front guard integrally with the body frame.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
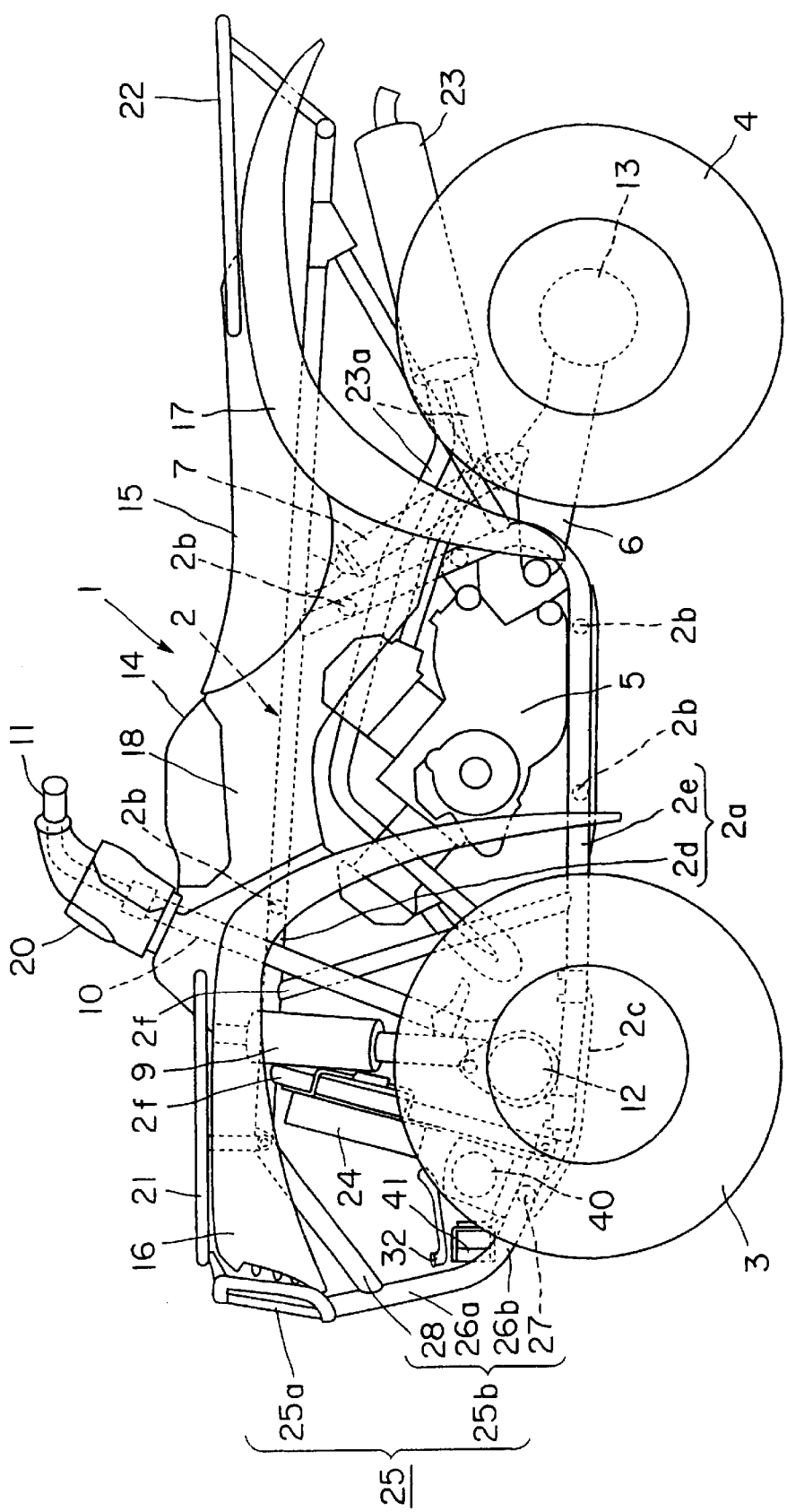
FIG. 1 is a side elevation of a straddle type four-wheeled all-terrain vehicle (so called four wheeled baggy, hereinafter referred to as "ATV") provided with a winch in a first embodiment according to the present invention.
Figure 2:
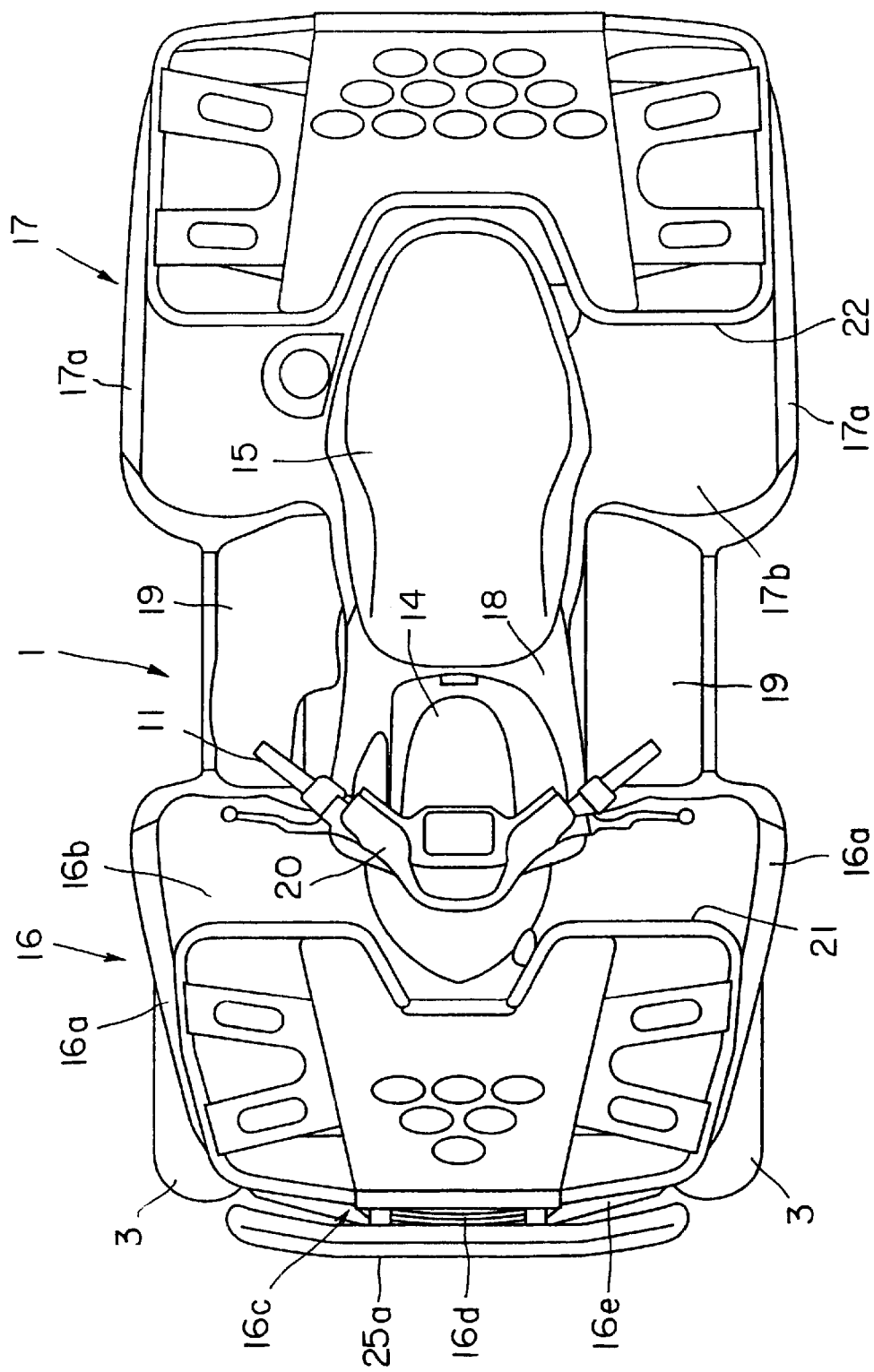
FIG. 2 is a plan view of the ATV shown in FIG. 1.

Referring to FIGS. 1 and 2, an ATV 1 has a body frame 2 formed mostly of pipe members assembled by welding. A water-cooled engine 5 is mounted on a middle part of the body frame 2. Front wheels 3 provided with low-pressure tires, i.e., balloon tires, are suspended from front right and front left parts of the body frame 2. Rear wheels 4 provided with low-pressure tires are suspended from rear right and rear left parts of the body frame 2. The right and the left rear wheel 4 are supported on rear end parts of swing arms 6 pivotally joined to a rear lower end part of the body frame 2 for swing motion in a vertical plane and supported by a suspension system 7. The right and the left front wheel 3 are supported by right and left linkages 9a(FIG. 3) individually connected to a front lower end part of the body frame 2 and supported by shock absorbers 9 so as to be able to swing in a vertical plane. A steering shaft 10 inclined obliquely rearward is supported on a front part of the body frame 2. The lower end of the steering shaft 10 is connected to the right and the left front wheel 3 by tie rods, not shown. A handlebar 11 is attached to the upper end of the steering shaft 10. The handlebar 11 is operated to control the front wheels 3 for steering.

As shown in FIG. 1, the front wheels 3 and the rear wheels 4 are driven through a transmission including drive shafts, not shown, and differential gears 12 and 13 by the engine 5 mounted on the body frame 2. A front carrier 21 that permits loading baggage thereon from the front side of the ATV, the handlebar 11, a fuel tank 14 and a seat 15 on which a driver sit astride are arranged on the body frame 2 in that order from the front toward the rear of the body frame 2. A rear carrier 22 is disposed behind the seat 15.

Referring to FIG. 2, the right and the left front wheel 3 are covered with a front fender 16. The front fender 16 has side parts 16a, a substantially horizontal middle part 16b extending between the side parts 16a, and a front part 16cb. The width of the front fender 16 decreases gradually toward the front. The front part 16c of the fender 16 has a grille 16d and is provided with headlight openings 16e formed contiguously with the opposite sides of the grille 16d, respectively. The right and the left rear wheel 4 are covered with a rear fender 17. The rear fender 17 has side parts 17a and a substantially horizontal middle part 17b extending between the side parts 17a and surrounding the seat 15. A cover 18 is provided on the body frame 2 between the front fender 16 and the rear fender 17 so as to surround the fuel tank 14. Right and left step boards 19 are disposed on a lower part of the body frame 2.

As shown in FIG. 1, a part of the steering shaft 10 and a part of the handlebar 11 near the joint of the steering shaft 10 and the handlebar 11 are covered with a handle cover 20 consisting of a front part and a rear part. As shown in FIGS. 1 and 2, a part of the middle part 16b of the front fender 16 is raised to the lower end of the handle cover 20. The front carrier 21 and the rear carrier 22 are mounted on the front fender 16 and the rear fender 17, respectively. Exhaust pipes 23a extended rearward from the exhaust ports of the cylinders of the engine 5 are connected to a muffler 23.

As shown in FIG. 1, the body frame 2 is built mostly by joining together pipe members having a circular cross section by welding. The body frame 2 has longitudinal right and left side frames 2a, and a plurality of lateral cross members 2b, 2c interconnecting the right and the left side frame 2a. Each of the right and the left side frame 2a has an upper frame member 2d and a lower frame member 2e. The upper frame member 2d and the lower frame member 2e are interconnected by a plurality of cross members 2f obliquely extended between the upper frame member 2d and the lower frame member 2e.

Figure 3:
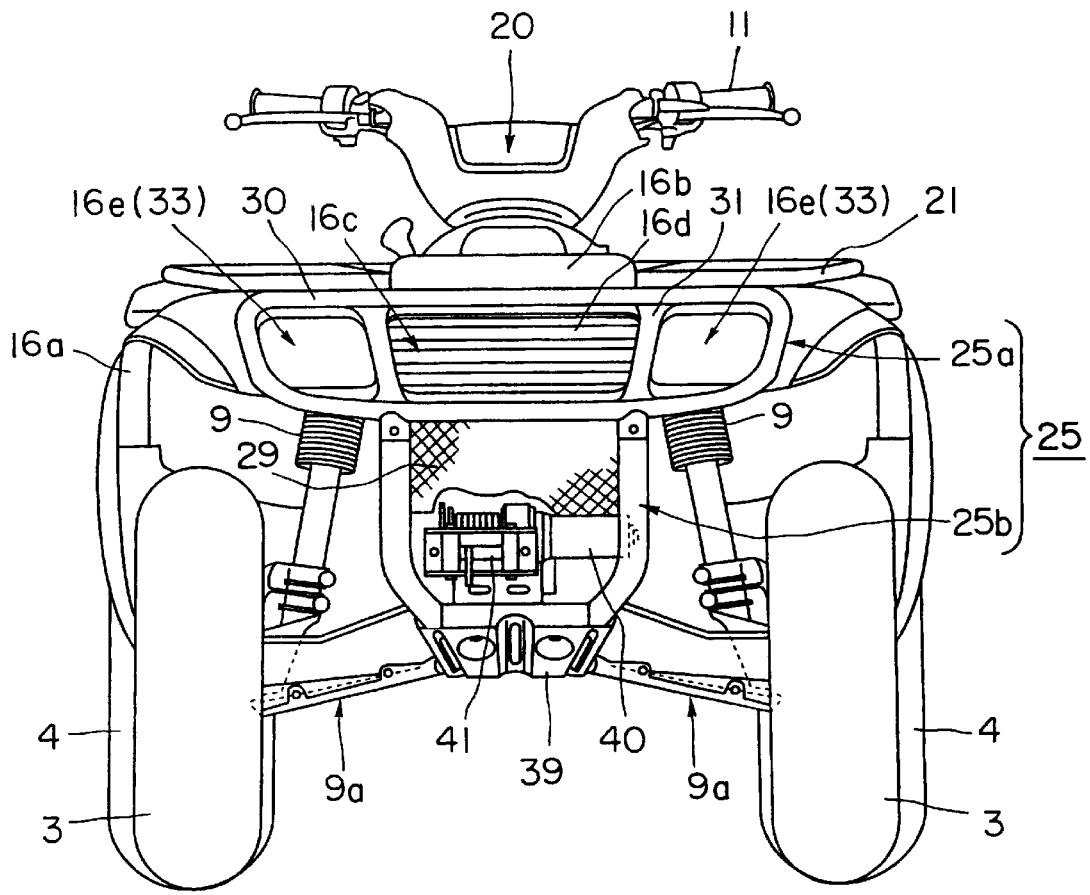
FIG. 3 is a front elevation of the ATV shown in FIG. 1.

As shown in FIGS. 1 and 3, a front guard 25 is connected to the front end of the body frame 2. The front guard 25 can be divided into an upper guard frame 25a and a lower guard frame 25b. The lower guard frame 25b forms a part of a front end part of the body frame 2. Therefore, the lower guard frame 25b is a substantially C-shaped frame formed of comparatively big pipe members. The lower guard frame 25b is connected to the lower frame members 2e of the right and the left side frame 2a. The lower guard frame 25b has right and left lower members 26b extending forward from the joints of the lower guard frame 25b and the body frame 2, a lower connecting member 27 extended between lower parts of the lower members 26b, front members 26a formed integrally with the lower members 26b so as to extend upward from the lower members 26b, respectively, straight upper members 28 inclined toward the rear so as to extend obliquely upward from the front members 26a and joined to the front ends of the upper frame members 2d. The lower ends of the upper members 28 are welded to the back sides of upper parts of the front members 26a, respectively. The joint of the lower end of each upper member 28 and the corresponding front member 26a is reinforced by a gusset, not shown.

As shown in FIG. 3, the upper guard frame 25a protects portions around the front part 16c of the front fender 16, particularly, headlights 33. Since the upper guard frame 25a does not need to be as strong as the lower guard frame 25b, the upper guard frame 25a is formed mostly of pipe members of a diameter smaller than that of the pipe members forming the lower guard frame 25b. The upper guard frame 25a has a pipe frame 30 having a shape substantially resembling an inverted trapezoid, and cross members 31 extended between the upper and lower frame members of the pipe frame 30 along the inner sides of the headlights 33, respectively.

The ATV 1 is provided with a radiator 24 for cooling water for cooling the cylinder and the cylinder head, etc., of the water-cooled engine 5. The radiator 24 is disposed behind the front guard 25 in a front part of the body frame 2. The radiator 24 is protected by a meshed radiator protecting plate 29 attached to the front guard 25 from stones and the like that fly toward the ATV while the ATV is running. A baffle plate 32 is extended in a rising slope from a lower part of the front guard 25 toward the lower end of the radiator 24 to guide air toward the radiator 24.

Figure 4:
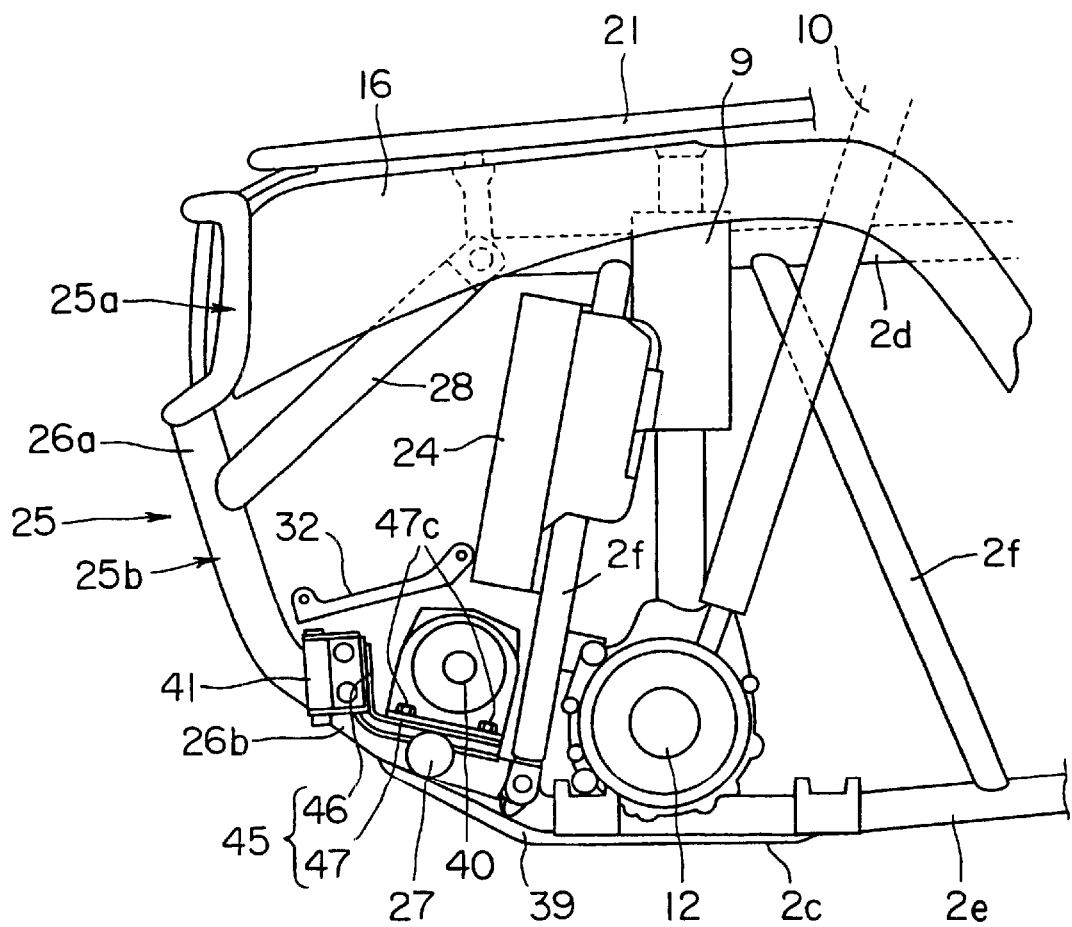
FIG. 4 is an enlarged side elevation of a front part of the ATV shown in FIG. 1.
Figure 6A:
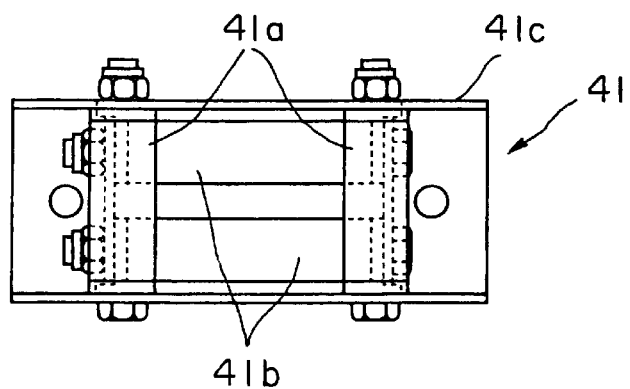
FIGS. 6A and 6B are a front elevation and a bottom view, respectively, of a guide roller mechanism for guiding a tow rope.
Figure 6B:
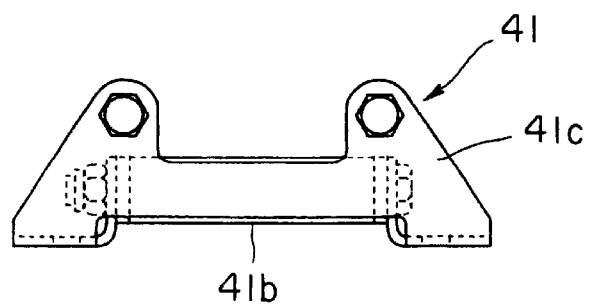
Figure 7A:
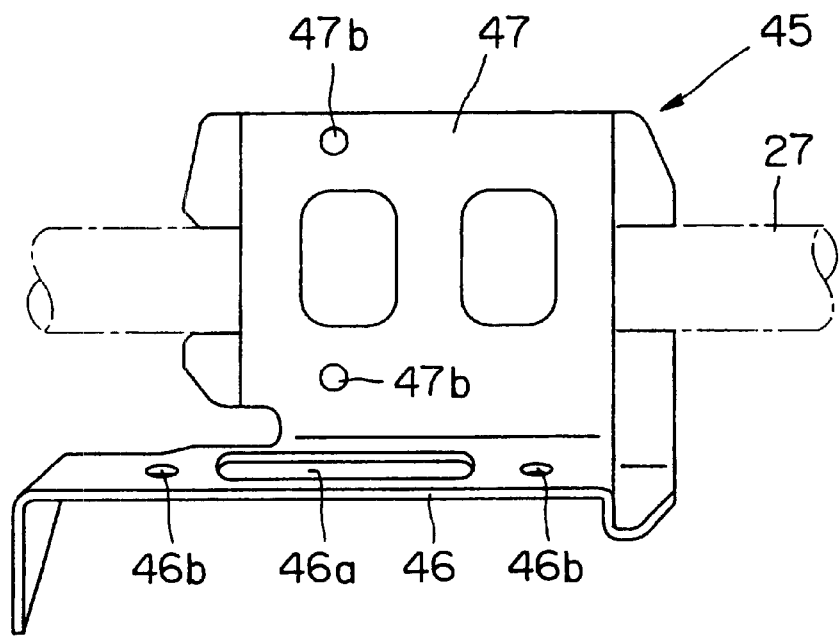
FIGS. 7A and 7B are a plan view and a front elevation, respectively, of a bracket for supporting the electric winch shown in FIG. 5 and the guide roller mechanism shown in FIGS. 6A and 6B.
Figure 7B:
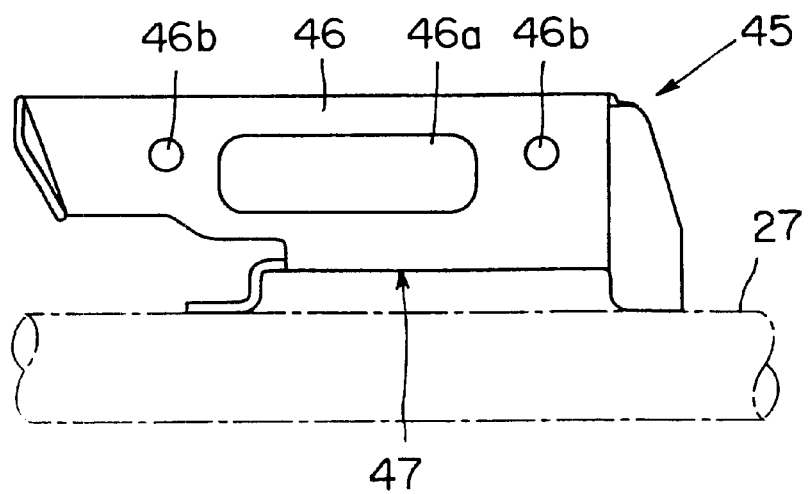

FIGS. 5 to 7B show a winch unit including an electric winch 40, a guide roller mechanism 41 for guiding a tow rope 49 and a bracket (winch supporting member) 45 for supporting the winch 40 in a lower part of the lower guard frame 25b. As shown in FIG. 4, the bracket 45 has a shape resembling the letter V from a side view and has a vertical front part 46 to which the guide roller mechanism 41 is attached and a horizontal base part 47 to which the electric winch 40 is attached. The vertical front part 46 for supporting the guide roller mechanism 41 rises from the front end of the horizontal base part 47. As shown in FIGS. 7A and 7B, the vertical front part 46 is provided with an opening 46a through which the tow rope 49 is passed and a pair of threaded holes 46b. The horizontal base part 47 is provided with a pair of threaded holes 47b. The horizontal base part 47 of the bracket 45 is seated on and welded to the lower connecting member 27 extended between the right and the left lower member 26b of the front guard 25. Although the lower connecting member 27 is a pipe in this embodiment, the lower connecting member 27 may be a plate. Although the lower connecting member 27 and the bracket 45 are separate members in this embodiment, the lower connecting member 27 and the bracket 45 may be replaced with a unitary member formed by processing a single plate and capable of serving as both the lower connecting member 27 and the bracket 45.

Figure 5:
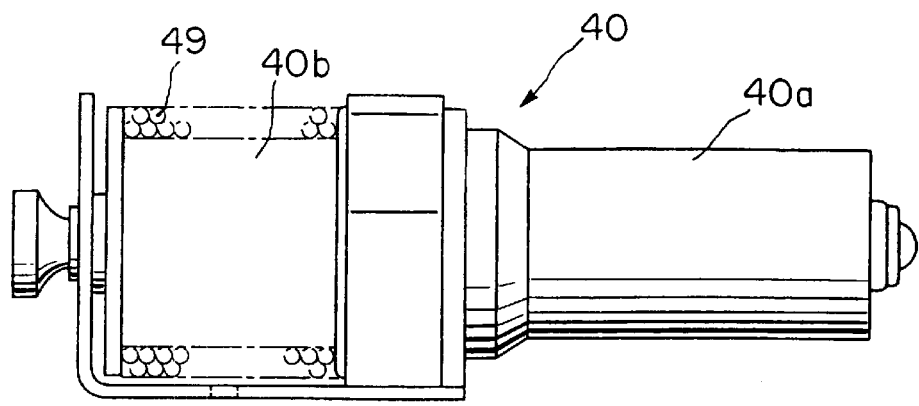
FIG. 5 is s front elevation of an electric winch.

As shown in FIG. 5, the electric winch 40 has an electric motor 40a and a drum 40b to be driven for rotation by the electric motor 40a. The tow rope 49 is wound round the drum 40b. As shown in FIGS. 6A and 6B, the guide roller mechanism 41 has a frame 41c, a pair of vertical guide rollers 41a spaced a predetermined distance apart from each other and supported for rotation on the frame 41c, and a pair of horizontal guide rollers 41b disposed behind the vertical guide rollers 41a, spaced a predetermined distance apart from each other and supported for rotation on the frame 41c. The tow rope 49 unwound from the drum 40b is passed through the opening 46a shown in FIG. 7A and 7B is extended forward through a space defined by the vertical guide rollers 41a and the horizontal guide rollers 41b shown in FIGS. 6A and 6B.

As shown in FIG. 4, the electric winch 40 is disposed in the lower guard frame 25b of the front guard 25 and is fastened to the base part 47 of the bracket 45 with bolts 47c. The guide roller mechanism 41 is fastened to the front part 46 of the bracket 45 with bolts, not shown. Thus, the electric winch 40 is located substantially directly below the radiator 24. The electric winch 40 and the guide roller mechanism 41 underlie the baffle plate 32. Thus, the electric winch 40 and the guide roller mechanism 41 are disposed in a space between the radiator 24 and the lower connecting member 27, and the baffle plate 32 is extended over the electric winch 40 and the guide roller mechanism 41 between a lower part of the front member 26a of the lower guard frame 25b of the front guard 25 and a lower part of the radiator 24. A lower cover 39 is disposed opposite to the electric winch 40 with respect to the lower connecting member 27 and is fastened to the right and left lower members 26b of the lower guard frame 25b with screws as shown in FIG. 3.

The operation of the ATV 1 according to the present embodiment will be described principally in terms of operations of the winch unit (including the electric winch 40 and the guide roller mechanism 41) and the radiator 24.

When the ATV 1 is stuck in a marshy place or the like and an attempt to hauling the ATV 1 out of the marshy place by means of the winch unit (40, 41) is made, the tow rope 49 is pulled out forward through the space between the guide rollers 41a and 41b of the guide roller mechanism 41. A free end part of the tow rope 49 is fastened to a fixed object, and the electric winch 40 is driven to coil the tow rope 49 on the drum 40b. Consequently, the ATV 1 is hauled toward the fixed object and can easily escape from the marshy place.

As shown in FIG. 4, the radiator 24 is disposed deep in the front guard 25. Since the ATV 1 often travels places of rough terrain, such as stony roads, the meshed radiator protecting plate 29 is attached to the front guard 25 so as to cover an opening in the lower guard frame 25b to protect the radiator 24 from stones and the like that may hit on the radiator 24. The electric winch 40 is disposed in the space between the lower part of the radiator 24 and the lower connecting member 27 interconnecting the right and the left lower member 26b and is not disposed in front of the radiator 24 and the baffle plate 32 is extended over the electric winch 40. Therefore, cooling air is able to flow directly toward the radiator 24 without being obstructed by the electric winch 40 and the guide roller mechanism 41. Thus, the electric winch 40 and the guide roller mechanism 41 do not deteriorate the cooling performance of the radiator 24.

A front guard in a second embodiment according to the present invention for a straddle type four-wheeled all-terrain vehicle (ATV) will be described with reference to FIGS. 8 to 12.

Figure 8:
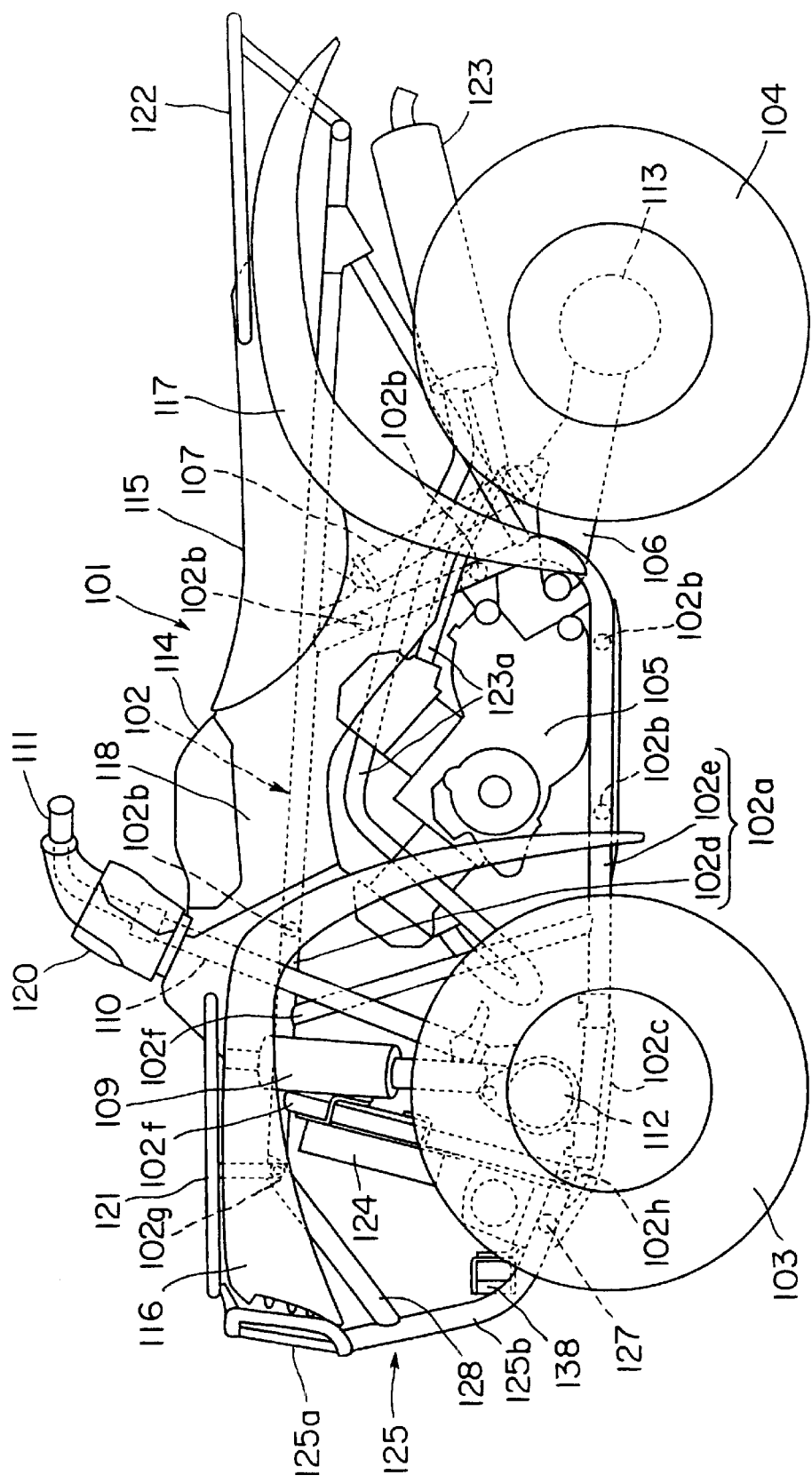
FIG. 8 is a side elevation of a straddle type four-wheeled all-terrain vehicle (ATV) provided with a front guard in a second embodiment according to the present invention.
Figure 9:
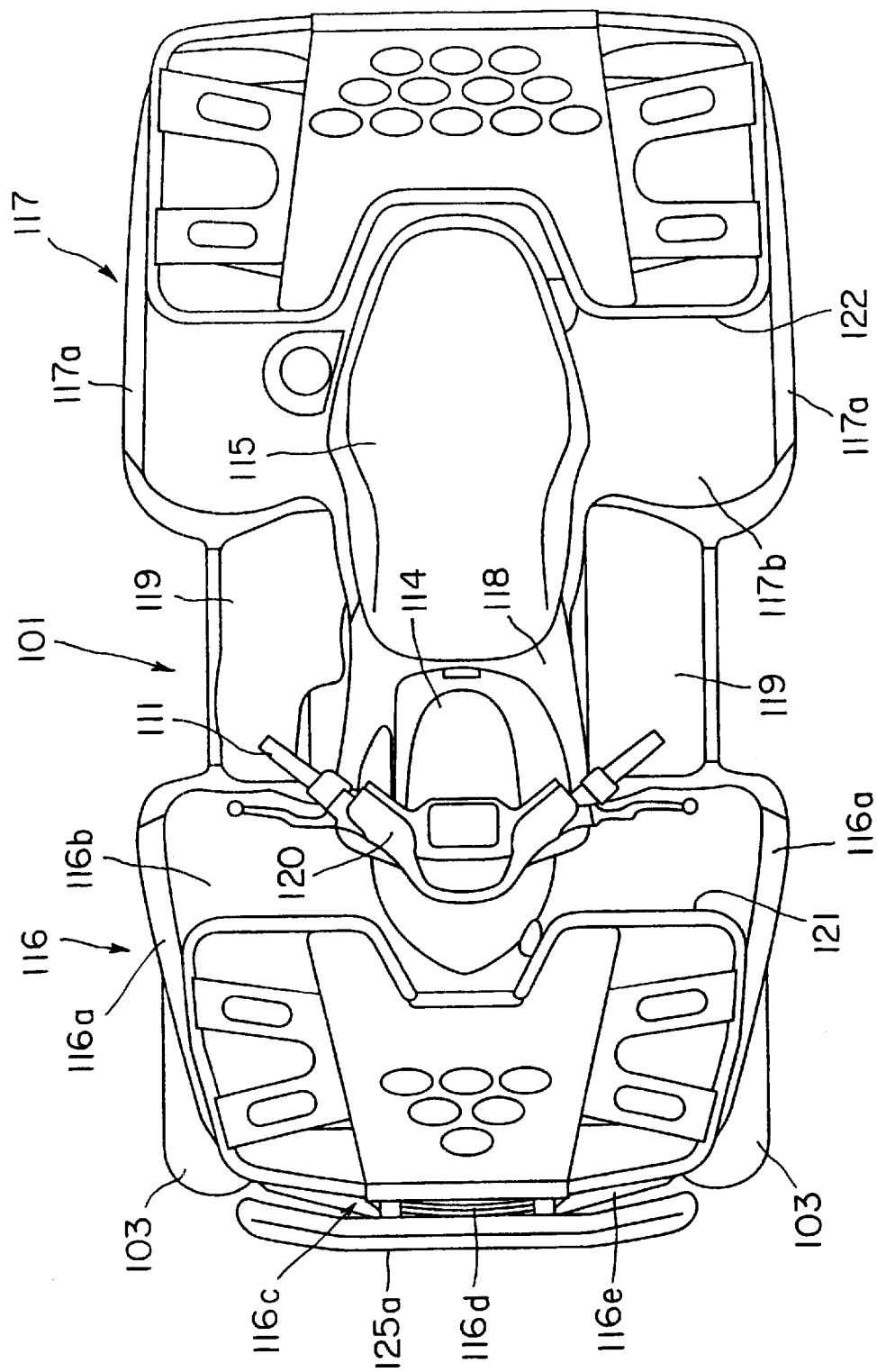
FIG. 9 is a plan view of the ATV shown in FIG. 8.

Referring FIGS. 8 and 9, an ATV 101 has a body frame 102 formed mostly of pipe members assembled by welding. An engine 105 is mounted on a middle part of the body frame 102. Front wheels 103 provided with low-pressure tires, i.e., balloon tires, are suspended from right and left front parts of the body frame 102. Rear wheels 104 provided with very-low-pressure tires are suspended from right and left rear parts of the body frame 102. The right and the left rear wheel 104 are supported on rear end parts of swing arms 106 pivotally joined to a rear lower end part of the body frame 102 for swing motion in a vertical plane and supported by a suspension system 107. The right and the left front wheel 103 are supported by right and left linkages 109a (FIG. 12) individually connected to a front lower end part of the body frame 102 and supported by shock absorbers 109 so as to be able to swing in a vertical plane. A steering shaft 110 inclined obliquely rearward is supported on a front part of the body frame 102. The lower end of the steering shaft 110 is connected to the right and the left front wheel 103 by tie rods, not shown. A handlebar 111 is attached to the upper end of the steering shaft 110. The handlebar 111 is operated to control the front wheels 103 for steering.

As shown in FIG. 8, the front wheels 103 and the rear wheels 104 are driven through a transmission including drive shafts, not shown, and differential gears 112 and 113 by the engine 105 mounted on the body frame 102. A front carrier 121 that permits loading baggage thereon from the front side of the ATV, the handlebar 111, a fuel tank 114 and a seat 115 on which a driver sit astride are arranged on the body frame 102 in that order from the front toward the rear of the body frame 102. A rear carrier 122 is disposed behind the seat 115.

Referring to FIG. 9, the right and the left front wheel 103 are covered with a front fender 116. The front fender 116 has side parts 116a, a substantially horizontal middle part 116b extending between the side parts 116a, and a front part 116c. The width of the fender 116 decreases gradually toward the front. The front part 116c of the front fender 116 has a grille 116d and is provided with headlight openings 116e formed contiguously with the opposite sides of the grille 116d, respectively. The right and the left rear wheel 104 are covered with a rear fender 117. The rear fender 117 has side parts 117a and a substantially horizontal middle part 117b extending between the side parts 117a and surrounding the seat 115. A cover 118 is provided on the body frame 102 between the front fender 116 and the rear fender 117 so as to surround the fuel tank 114. Right and left step boards 119 are disposed on a lower part of the body frame 102.

As shown in FIG. 8, a part of the steering shaft 110 and a part of the handlebar 111 near the joint of the steering shaft 110 and the handlebar 111 are covered with a handle cover 120 consisting of a front part and a rear part. As shown in FIGS. 8 and 9, a part of the middle part 116b of the front fender 116 is raised to the lower end of the handle cover 120. The front carrier 121 and the rear carrier 122 are mounted on the front fender 116 and the rear fender 117, respectively.

As shown in FIG. 8, the engine 105 is a V-type water-cooled engine. Exhaust pipes 123a extended rearward from the exhaust ports of the cylinders of the engine 105 are connected to a muffler 123. A radiator 124 is disposed behind a front guard 125 in a front part of the body frame 102.

Figure 10:
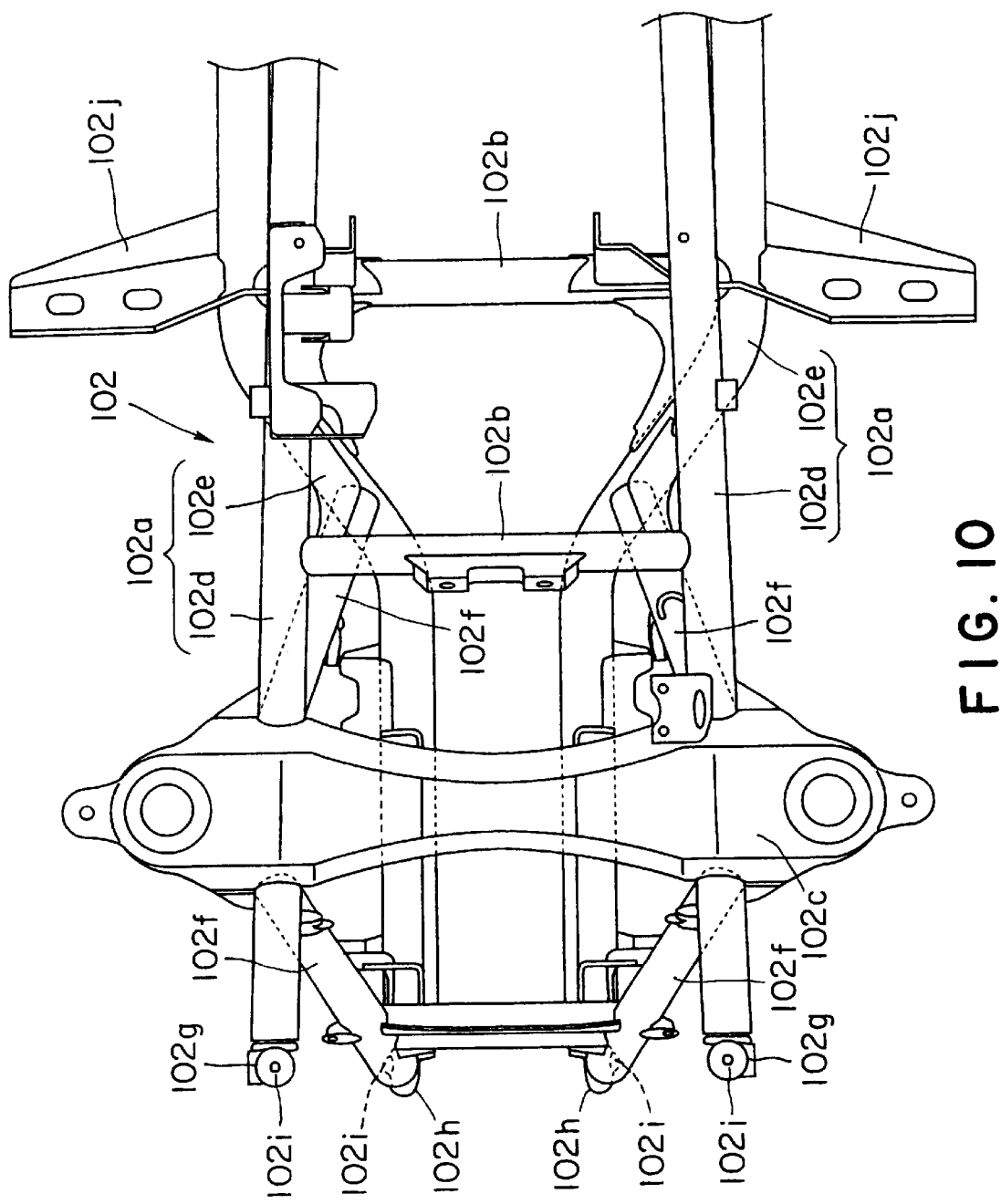
FIG. 10 is an enlarged bottom view of a front part of a body frame.

As shown in FIGS. 8 and 10, the body frame 102 is built mostly by joining together pipe members having a circular cross section by welding. The body frame 102 has longitudinal right and left side frames 102a, and a plurality of lateral cross members 102b, 102c interconnecting the right and the left side frame 102a. Each of the right and the left side frame 102a has an upper frame member 102d and a lower frame member 102e. The upper frame member 102d and the lower frame member 102e are interconnected by a plurality of cross members 102f obliquely extended between the upper frame member 102d and the lower frame member 102e. Joining members 102g and 102h are welded to the front ends of the upper frame member 102d and the lower frame member 102e, respectively. The joining members 102g and 102h have joining parts provided with threaded holes 102i, respectively. As shown in FIG. 10, support frame 102j for supporting a step board 119 (FIG. 9) thereon is welded to a middle part of each lower frame member 102e so as to project laterally outward from the lower frame member 102e.

Figure 11:
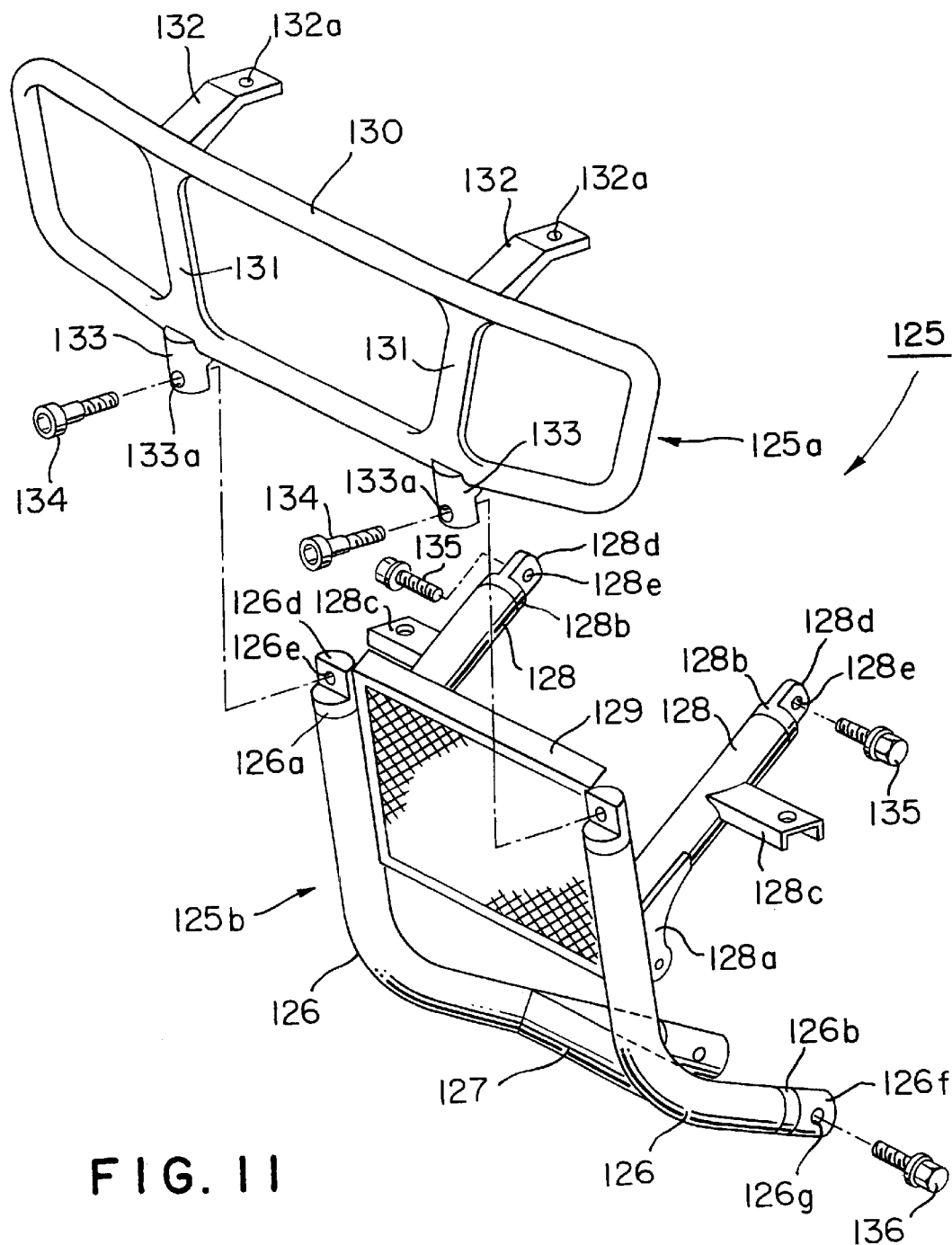
FIG. 11 is an exploded perspective view of the front guard included in the ATV shown in FIG. 8.

A front guard 125 in the second embodiment according to the present invention is connected to the front end of the body frame 102 as shown in FIG. 8. As shown in FIG. 11, the front guard 125 can be divided into an upper guard frame 125a and a lower guard frame 125b. The lower guard frame 125b forms a part of a front end part of the body frame 102. Therefore, the lower guard frame 125b is formed of comparatively big pipe members. The lower guard frame 125b is connected to the lower frame members 102e of the right and the left side frame 102a. The lower guard frame 125b has substantially C-shaped right and left side members 126, a cross member 127 joined to and interconnecting lower parts of the side members 126, and straight stay pipes 128 extending obliquely upward from upper parts of the side members 126. The lower ends of the stay pipes 128 are welded to the back sides of upper parts of the side members 126, respectively. The joint of stay pipe 128 and the corresponding side member 126 is reinforced by a gusset 128a.

An upper joining member 126a is fixed to the upper end of each side member 126. The upper joining member 126a is formed in the shape of a half cylinder and is provided with a threaded hole 126e. A lower joining member 126b is fixed to the lower end of each side member 126. The lower joining member 126b having a connecting part 126f is fixed to the lower end of the side member 126. The connecting part 126f is provided with a threaded hole 126g. A joining member 128b similar to the lower joining member 126b and provided with a connecting part 128d having a threaded hole 128e is fixed to the upper end of each stay pipe 128. A headlight support 128c for supporting a headlight 140 (FIG. 9) is welded to a middle part of each stay pipe 128. A radiator protecting plate 129 for protecting a radiator 124 is disposed between and welded to upper parts of the side members 126. The headlights 140 are supported on the headlight supports 128c so as to lie in headlight openings 116e formed in the front part 116c of the front fender 116, respectively.

Figure 12:
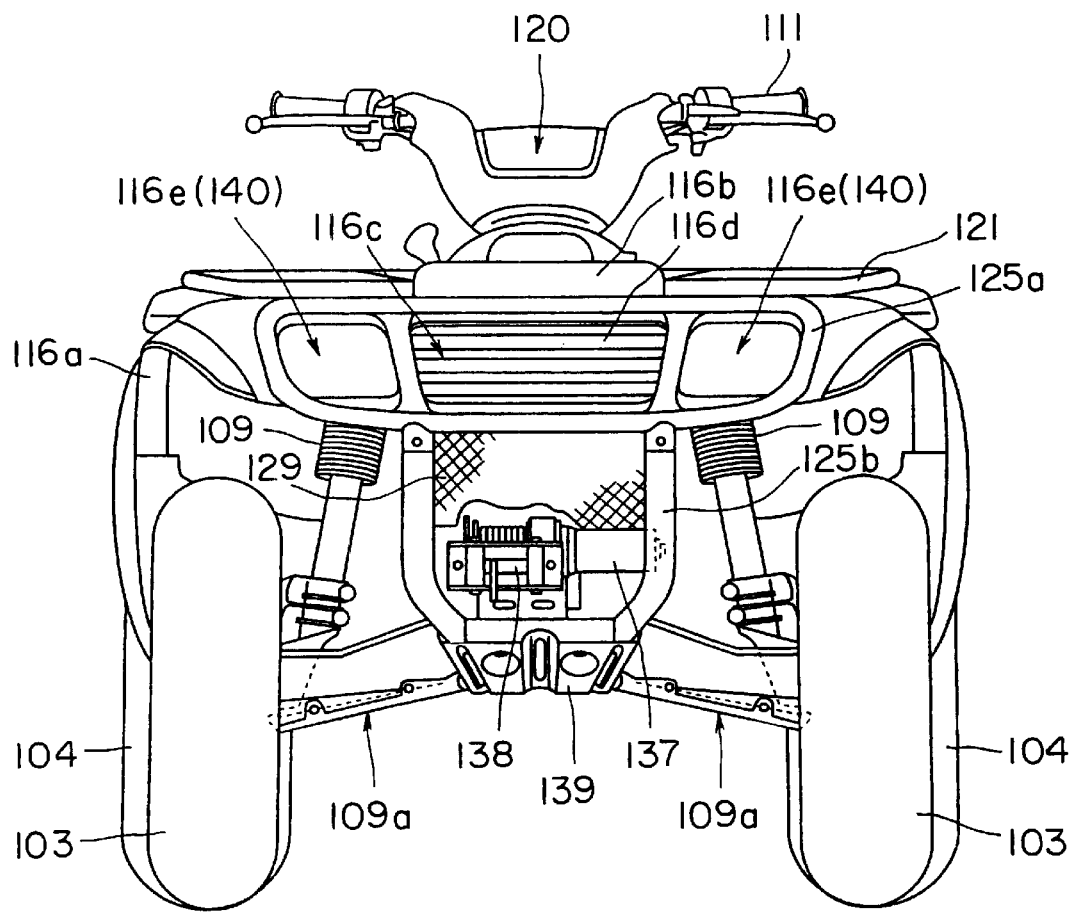
FIG. 12 is a front elevation of the ATV shown in FIG. 8.
Figure 13:
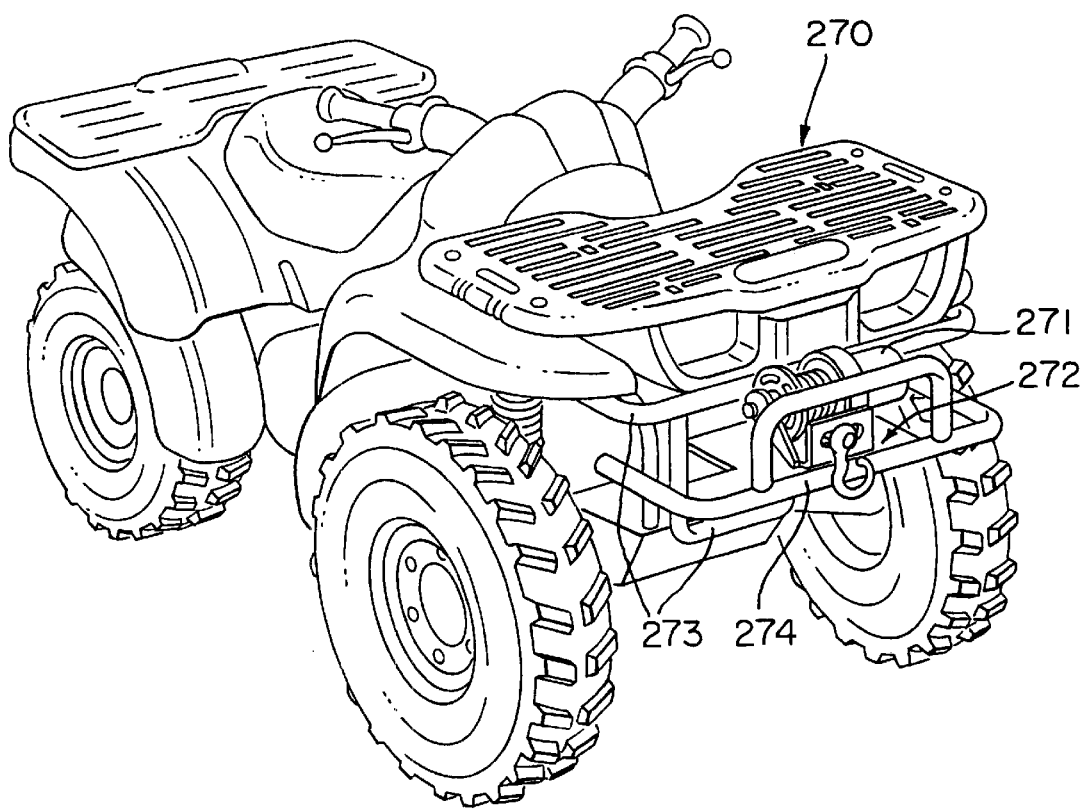
FIG. 13 is a perspective view of a conventional ATV provided with an ordinary winch.
Figure 14A:
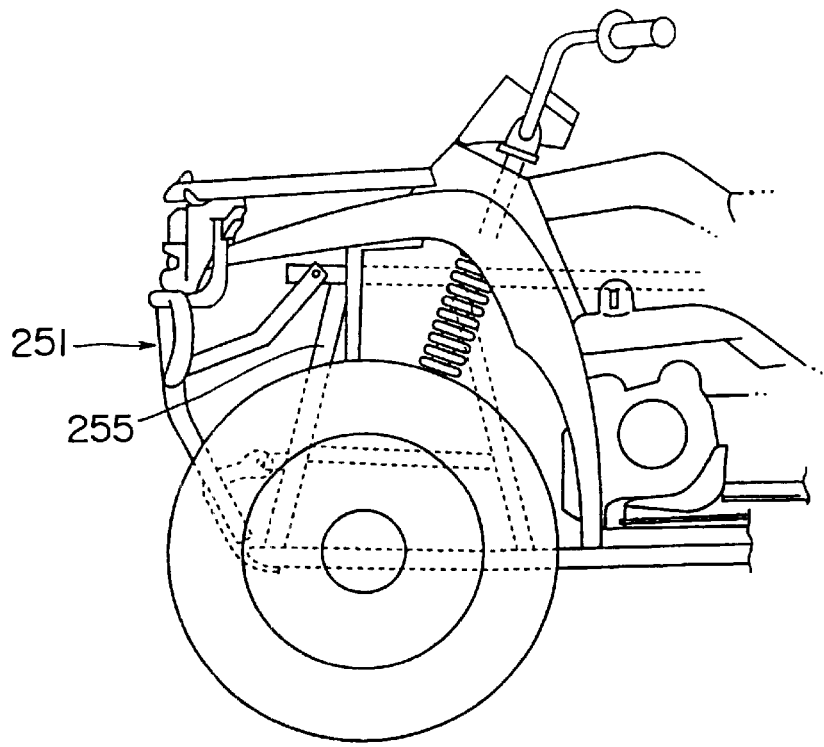
FIGS. 14A and 14B are a side elevation and an exploded perspective view, respectively, of a front part of a conventional ATV provided with an ordinary front guard.
Figure 14B:
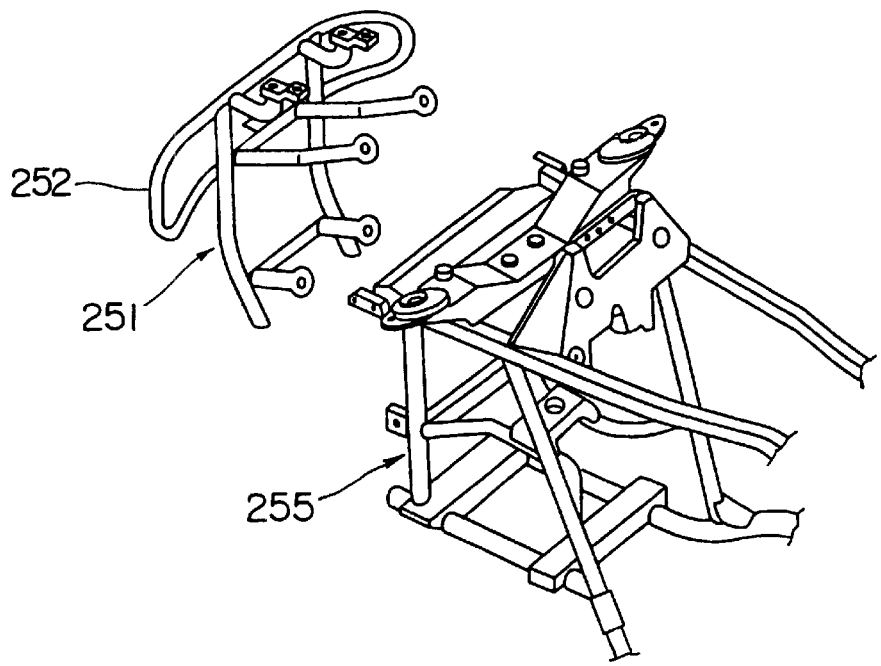
Figure 15:
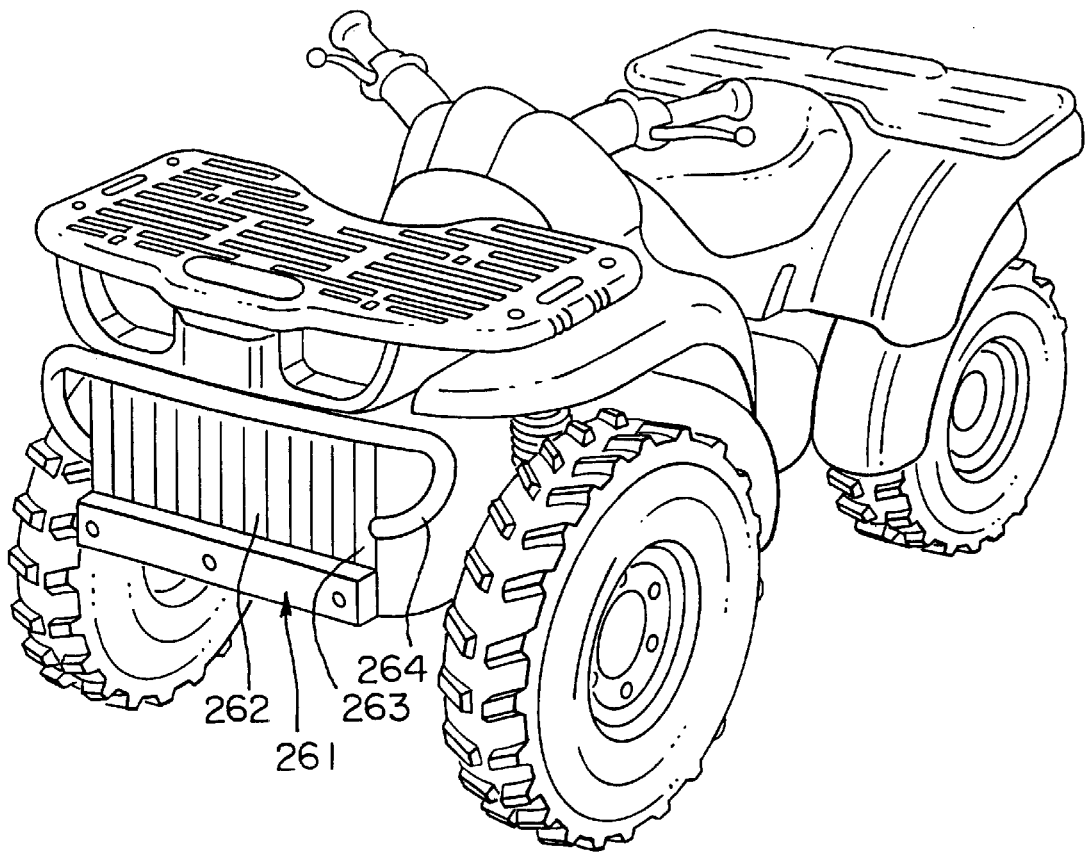
FIG. 15 is a perspective view of another conventional ATV provided with an ordinary front guard.

The upper guard frame 125a is disposed in front of the front part 116c of the front fender 116 so as to cover the front part 116c including the headlights 140 as shown in FIG. 12. Since the upper guard frame 125a does not need to be as strong as the lower guard frame 125b, the upper guard frame 125a is formed mostly of pipe members of a diameter smaller than that of the pipe members forming the lower guard frame 125b. As shown in FIG. 11, the upper guard frame 125a has a pipe frame 130 having a shape substantially resembling an inverted trapezoid and corresponding to that of the front part 116c of the front fender 116, and flat cross members 131 extended between the upper and lower frame members of the pipe frame 130 along the inner sides of the headlights 140, respectively. Flat stay 132 provided with a through hole 132a are welded to parts of the upper frame member of the pipe frame 130 corresponding to the cross members 131, respectively, so as to extend perpendicularly rearward from the upper frame member. Joining members 133 resembling a short half cylinder and provided with a through hole 133a are welded to the front sides of parts of the lower frame member of the pipe frame 130 corresponding to the cross members 131, respectively, so as to extend perpendicularly downward from the lower frame member. The joining members 133 are mated with the connecting parts 126d of the joining members 126a and are fastened to the joining members 126a by screwing screws (bolts) 134 through the through holes 133a of the joining members 133 in the threaded holes 126e of the connecting parts 126d of the joining members 126a.

The lower guard frame 125b is joined to the body frame 102 by fastening the joining members 126b fixed to the lower ends of the side members 126 to the joining members 102h welded to the front ends of the lower frame members 102e (FIG. 10) with screws (bolts) 136, respectively, and fastening the joining members 128b fixed to the stay pipes 128 to the joining members 102g attached to the front ends of the upper frame members 102d of the body frame 102 with screws (bolts) 35, respectively. The upper guard frame 125a and the lower guard frame 125b are joined together by screwing the screws (bolts) 134 through the through holes 133a of the joining members 133 in the threaded holes 126e of the connecting parts 126d of the joining members 126a attached to the upper ends of the side members 126 of the lower guard frame 125b. The flat stays 132 of the upper guard frame 125a are fastened to front carrier 121 by screwing screws, not shown, through the through holes 132a of the flat stays 132 in threaded holes, not shown, formed in a front end part of the front carrier 121.

Thus, the front guard 125 is fastened to the body frame 102 and the frontcarrier121. A winch137 is mountedon thecross member 127. A guide roller mechanism 138 is disposed in a space between the side members 126 in front of the winch 137. A lower cover 139 is disposed opposite to the winch 137 with respect to the cross member 127 and is fastened to the right and left side members 126 of the lower guard frame 125b with screws.

The following modifications are possible. (1) The upper guard frame 125a and the lower guard frame 125b of the front guard 125 shown in FIG. 11 may be formed of pipes of different materials, respectively. For example, the upper guard frame 125a may be formed of pipes of an aluminum alloy and the lower guard frame 125b may be formed of pipes of a steel. (2) The upper guard frame 125a and the lower guard frame 125b of the front guard 125 may be welded together.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A straddle type four-wheeled all-terrain vehicle, comprising:
    a body frame having a front end part;
    a front guard joined to the front end part of the body frame; and
    a winch unit including an electric winch and a guide roller mechanism for guiding a tow rope, the electric winch and the guide roller mechanism being arranged longitudinally from a rear toward a front in that order in a lower part of a space existing behind and protected by the front guard,
    wherein the body frame has right and left lower frame members each having a front end;
    wherein the front guard has right and left lower members joined to the front ends of the right and left lower frame members of the body frame and extending forward from the front ends of the right and left lower frame members, right and left front members extending upward from the right and left lower members and located at substantially the same position in a longitudinal direction as a front end of a front fender is located so as to form a front end of the front guard protecting the front fender, and a lower cross member disposed rearward with respect to the front members and extending between the right and left lower members; and
    wherein a winch support member for supporting the electric winch is joined to the lower cross member of the front guard, the winch support member supporting the electric winch so that the electric winch is located under the front fender.

2. The straddle type four-wheeled all-terrain vehicle according to claim 1, wherein a guide roller mechanism support member capable of detachably supporting the guide roller mechanism in front of the electric winch is formed integrally with the winch support member.

3. The straddle type four-wheeled all-terrain vehicle according to claim 1, wherein the electric winch is disposed in a space between a lower part of a radiator for cooling an engine cooling water disposed in a front part of the body frame and the lower cross member.

4. A front guard formed mostly of pipe members and joined to a front end of a body frame included in a straddle type four-wheeled all-terrain vehicle comprising the body frame, a front carrier mounted on a front part of the body frame and permitting baggage to be loaded thereon from a frontward direction, a handlebar for steering front wheels, a seat for a driver disposed behind the handlebar, a rear carrier disposed behind the seat, and a front fender disposed below the front carrier so as to cover the front wheels; the front guard comprising:
    an upper guard frame forming an upper part of the front guard; and
    a lower guard frame forming a lower part of the front guard;
    wherein the upper and lower guard frames are formed as separate units from each other and are detachably joined to teach other so that the upper and lower guard frames can be rejoined to each other after being detached from each other;
    wherein the lower guard frame is joined to front ends of right and left upper and lower frame members included in the body frame;
    wherein the pipe members forming the upper guard frame have a diameter smaller than a diameter of the pipe members forming the lower guard frame;
    wherein a lower end part of the upper guard frame is fastened to an upper end part of the lower guard frame with a bolt; and
    wherein an upper end part of the upper guard frame is fastened to a lower part of the front carrier with a bolt.

5. A front guard formed mostly of pipe members and joined to a front end of a body frame included in a straddle type four-wheeled all-terrain vehicle comprising the body frame, a front carrier mounted on a front part of the body frame and permitting baggage to be loaded thereon from a frontward direction, a handlebar for steering front wheels, a seat for a driver disposed behind the handlebar, a rear carrier disposed behind the seat, and a front fender disposed below the front carrier so as to cover the front wheels; the front guard comprising:
    an upper guard frame forming an upper part of the front guard; and
    a lower guard frame forming a lower part of the front guard;
    wherein the upper and lower guard frames are formed as separate units from each other and are detachably joined to each other so that the upper and lower guard frames can be rejoined to each other after being detached from each other;
    wherein the lower guard frame is joined to front ends of right and left upper and lower frame members included in the body frame; and
    wherein the pipe members forming the upper guard frame have a diameter smaller than a diameter of the pipe members forming the lower guard frame, wherein the lower guard frame comprises a pair of side members curved in a shape of a letter C, a cross member joined to lower ends of the side members, and stay members extending obliquely upward from upper end parts of the side members; and
    wherein the lower guard frame can be fastened to the front ends of the upper and the lower frame members with bolts.

6. The straddle type four-wheeled all-terrain vehicle according to claim 3, wherein a baffle plate is disposed over the winch so as to extend between the front members of the front guard and the lower part of the radiator.

7. The front guard according to claim 5, wherein a winch unit including an electric winch and a guide roller mechanism for guiding a tow rope is arranged longitudinally from a rearward toward a front in that order in a lower part of a space existing behind and protected by the front guard.

8. The front guard according to claim 7, wherein a winch support member for supporting the electric winch is joined to the cross member of the lower guard frame.

9. The front guard according to claim 8, wherein a guide roller mechanism support member capable of detachably supporting the guide roller mechanism in front of the electric winch is formed integrally with the winch support member.

* * * * *